United States Patent
Crawford et al.

(10) Patent No.: US 8,929,329 B2
(45) Date of Patent: Jan. 6, 2015

(54) SYSTEM AND METHOD FOR DUAL-MODE HANDOFF

(75) Inventors: Christopher M. Crawford, Exeter, NH (US); Muzaffer Kanaan, Watertown, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1141 days.

(21) Appl. No.: 11/960,358

(22) Filed: Dec. 19, 2007

(65) Prior Publication Data

US 2009/0161626 A1 Jun. 25, 2009

(51) Int. Cl.
- *H04W 4/00* (2009.01)
- *H04W 36/00* (2009.01)
- *H04W 36/14* (2009.01)

(52) U.S. Cl.
CPC ..................................... *H04W 36/14* (2013.01)
USPC .......................................... 370/331; 455/436

(58) Field of Classification Search
CPC ...................................................... H04W 36/30
USPC ........................................................... 370/331
See application file for complete search history.

(56) References Cited

U.S. PATENT DOCUMENTS

| | | | | |
|---|---|---|---|---|
| 6,138,021 A * | 10/2000 | Arrington et al. | ............. | 455/436 |
| 7,154,868 B1 * | 12/2006 | Sharma et al. | ................. | 370/331 |
| 7,356,015 B2 * | 4/2008 | Ibe et al. | ........................ | 370/338 |
| 7,477,897 B2 * | 1/2009 | Bye | ................................ | 455/436 |
| 7,536,186 B2 * | 5/2009 | Dorenbosch et al. | .......... | 455/440 |
| 7,546,125 B2 * | 6/2009 | Sharma et al. | ................. | 455/436 |
| 7,586,876 B2 * | 9/2009 | Chung et al. | ................... | 370/331 |
| 7,706,796 B2 * | 4/2010 | Rimoni et al. | ................ | 455/436 |
| 7,933,602 B1 * | 4/2011 | Balakrishnan et al. | ........ | 455/437 |
| 2005/0078633 A1 * | 4/2005 | Watanabe et al. | ............. | 370/331 |
| 2005/0090259 A1 | 4/2005 | Jain et al. | | |
| 2006/0077956 A1 * | 4/2006 | Saksena et al. | ............... | 370/352 |
| 2006/0077957 A1 * | 4/2006 | Reddy et al. | ................... | 370/352 |
| 2006/0098627 A1 * | 5/2006 | Karaoguz et al. | ............. | 370/352 |
| 2006/0120355 A1 | 6/2006 | Zreiq et al. | | |
| 2006/0121916 A1 * | 6/2006 | Aborn et al. | ............... | 455/456.5 |
| 2006/0205407 A1 * | 9/2006 | Jagadeesan et al. | .......... | 455/436 |
| 2006/0217112 A1 * | 9/2006 | Mo | .............. | 455/422.1 |
| 2007/0019586 A1 * | 1/2007 | Nanda et al. | ................... | 370/335 |
| 2007/0070948 A1 * | 3/2007 | Kezys et al. | ................... | 370/331 |
| 2007/0177530 A1 * | 8/2007 | Ando et al. | .................... | 370/277 |
| 2007/0258407 A1 * | 11/2007 | Li et al. | ......................... | 370/331 |
| 2007/0280152 A1 * | 12/2007 | Thomson et al. | ............. | 370/328 |
| 2008/0037493 A1 * | 2/2008 | Morton | ......................... | 370/338 |
| 2008/0064400 A1 * | 3/2008 | Benco et al. | ................... | 455/436 |
| 2008/0080462 A1 * | 4/2008 | Kundu et al. | ................. | 370/342 |
| 2011/0263274 A1 * | 10/2011 | Fox et al. | .................... | 455/456.2 |

* cited by examiner

*Primary Examiner* — Shaq Taha

(57) ABSTRACT

Exemplary embodiments include methods and systems for a deterministic facilitating for a dual-mode handoff between a local area network (LAN) and a wide area network (WAN). The hand-off method may include associating identification information with a mobile user device and locating the mobile user device within a local area network based at least in part on the identification information associated with the mobile user device. The hand-off method may also include moving the mobile user device outside a coverage area of the local area network, associating the mobile user device with a wide area network based at least in part on the identification information associated with the mobile user device, and updating a wide area network server of a location associated with the mobile user device.

24 Claims, 7 Drawing Sheets

SYSTEM AND METHOD FOR DUAL-MODE HANDOFF

BACKGROUND INFORMATION

Local area networks (LAN) and wide area networks (WAN) are becoming increasingly popular in residential and commercial areas. As users become increasingly mobile, demand for compatibility and seamless transition between local area network (LAN) and wide area network (WAN) have also increased. However, this may create problems for networks based application attempting to coordinate service delivery between the local area network (LAN) and wide area network (WAN). For example, when a user leaves a local area network (LAN) and enters a wide area network (WAN), the user may still be associated with the local area network (LAN), or vice versa. Moreover, a user device may be associated with different identification information for the local area network (LAN) and the wide area network (WAN). Therefore, it may be problematic for a user hand off to the new network. The original network may still think that the user is on the network, whereas the user has already handed off to another network. Thus, the accuracy of determining the location of the user as well as the handoff process can be made more efficient. Therefore, a system and method of determining when a user has left the original network and entered a new network can be beneficial.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY

A system and method in accordance with exemplary embodiments may include a deterministic method of facilitating for a dual-mode handoff between a local area network (LAN) and a wide area network (WAN). In one exemplary embodiment, local area networks (LAN) and/or wide area networks (WAN) may be based on one or more wireless technologies. Also, local area networks (LAN) and/or wide area networks (WAN) may be various coverage ranges. For example, a local area network (LAN) may refer to a localized area network, while a wide area network (WAN) may refer to a spread out area network. The coverage range of a local area network (LAN) may be smaller or equal to the coverage range of a wide area network (WAN). Also, in one exemplary embodiment, disparate networks may refer to the networks having different network domains. However, disparate networks may not refer to networks of different type and/or size.

The description below describes servers, computers, wireless devices, networks and other networking devices that may include one or more modules, some of which are explicitly depicted, others of which are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, etc.) separately. The functions described as being performed at various components may be performed at other components, and the various components may be combined and/or separated. Other modifications also may be made.

Figure 1:
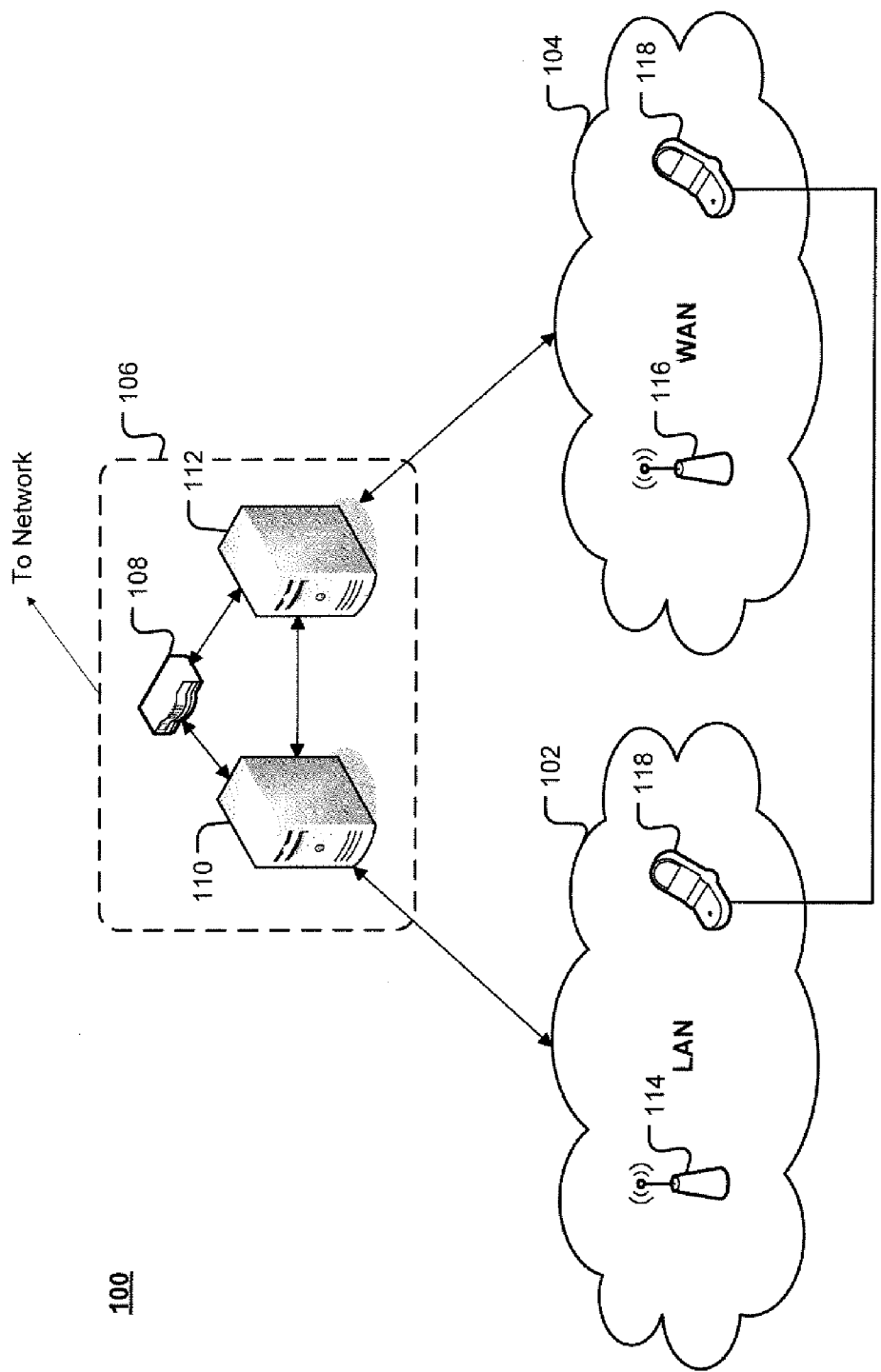
FIG. 1 illustrates an exemplary system for facilitating a dual-mode handoff between disparate networks in accordance with an exemplary embodiment.

FIG. 1 illustrates an exemplary system 100 for facilitating a dual-mode handoff between disparate networks in accordance with an exemplary embodiment. As illustrated in FIG. 1, system 100 may include two disparate networks, local area network (LAN) 102 and wide area network (WAN) 104 which may interact with a service provider 106. The service provider 106 may be associated with, but is not limited to, content service providers, enterprises, educational institutions, government agencies, and any individual, group and/or organization running, maintaining and/or providing a network. The service provider 106 may further include a router 108 connected to a local area network (LAN) server 110 and/or a wide area network (WAN) server 112. The service provider 106 may be coupled to another network (not shown). Local area network (LAN) access points 114 and wide area network (WAN) access points 116 may be associated with the local area network (LAN) 102 and the wide area network (WAN) 104, respectively. A user may be assigned identification information (e.g., phone number, electronic serial number (ESN) and/or uniform resource locator (URL)) by the service provider 106. The service provider 106 may allow a user to go from local area network (LAN) 102 to wide area network (WAN) and/or vice versa with the same identification information associated with the user.

The local area network (LAN) 102 may be a wired network, a wireless network and/or a combination thereof. The local area network (LAN) 102 may include, without limitation, wireless local area network (LAN), wireless personal area network (PAN), Wi-Fi, Fixed Wireless Data, IEEE 802.11a, 802.11b, 802.15.1, 802.11n and 802.11g and/or other communication networks. In addition, local area network (LAN) 102 may include, without limitation, co-axial cable, telephone line, fiber optics, IEEE Ethernet 802.3, global network such as the Internet. The local area network (LAN) 102 may further include one, or any number of the exemplary types of networks mentioned above operating as a stand-alone network or in cooperation with each other.

The wide area network (WAN) 104 may be a wired network, wireless network and/or a combination thereof. The wide area network (WAN) 104 may include, without limitation, wireless wide area network (WAN), WiMax, 3rd Generation Partnership Project (3GPP) networks, 3rd Generation Partnership Project 2 (3GPP2) networks, Global System for Mobile Communication (GSM), Personal Communication Service (PCS), time-division multiple access (TDMA) networks, digital advanced mobile phone service (D-AMPS), satellite network. In addition, the wide area network (WAN) 104 may include, without limitation, metropolitan area networks (MANs), mobitex, general packet radio service (GPRS), universal mobile telephone service (UMTS), amateur packet radio (AX 25), nordic mobile telephony (NMT), advanced mobile phone system (AMPS), Canopy network and/or other wireless communication networks. Also, the wide area network (WAN) 104 may enable a wireless communication network, a cellular network, an Intranet, or other networks for conveying data, or any combination thereof. The wide area network (WAN) 104 may further include one, or any number of the exemplary types of networks mentioned above operating as a stand-alone network or in cooperation with each other.

Router 108 may be a device that determines a transmission path for data to travel between network 102 and network 104. Router 108 may be, without limitation, an internet service provider router, a telephone router, an Ethernet router, a satellite router, a fiber optic router, a co-axial cable router and/or other routing device that may provide and/or determine a transmission path for data to travel between networks. Furthermore, router 108 may include a computer, software and/or hardware to facilitate a routing and/or forwarding function of a signal.

The local area network (LAN) server 110 may be a communication server associated with the local area network (LAN) 102. For example, the local area network (LAN) server 110 may be a WiFi server, VoIP server, IEEE 802.11 server. The local area network (LAN) server 110 may include a computer server including disk drives, central processing units (CPU), graphical user interfaces (GUI), operating systems, and/or other components for supporting a network. The local area network (LAN) server 110 may further include one or more storage mediums containing one or more databases.

The wide area network (WAN) server 112 may be a communication server associated with the wide area network (WAN) 104. For example, the wide area network (WAN) server 112 may be one or more WiMax servers, a 3GPP/3GPP2 server, cellular telephone servers, AdvancedTCA servers, MicroTCA servers, Carrier Grade Linux servers, Service Availability Forum specification servers, IP Multimedia Subsystem (IMS) servers, IP Television (IPTV) servers, wireless broadband servers and/or other servers to support a wide area network (WAN). The wide area network (WAN) server 112 may further include one or more storage mediums containing one or more databases.

Local area network (LAN) access points 114 may be base stations for the local area network (LAN) 102. The local area network (LAN) access points may include transceivers for transmit and/or receive radio frequencies with the user mobile devices.

Wide area network (WAN) access points 116 may be a scalable, multi-channel, two-way communication device. Wide area network (WAN) access points 116 may be a universal mobile telecommunications system (UMTS) including base transceiver stations (BTS), Node-B, radio network controllers (RNC) and grid-scale networks (GSN). Also, wide area network (WAN) access points 116 may be a global system for mobile communications (GSM) base stations, a code-division multiple access (CDMA) base stations, WiMax base stations and/or other network base stations to allow a user to connect to a wide area network (WAN).

Mobile user device 118, may be a personal computer (PC), a workstation, a mobile device, a phone, a handheld PC, a personal digital assistant (PDA), a thin system, a fat system, a network appliance, an Internet browser, a paging, an alert device, a television, an interactive television, a receiver, a tuner, a high definition (HD) television, a HD receiver, a video-on-demand (VOD) system, and/or other mobile communication devices.

Figure 2:
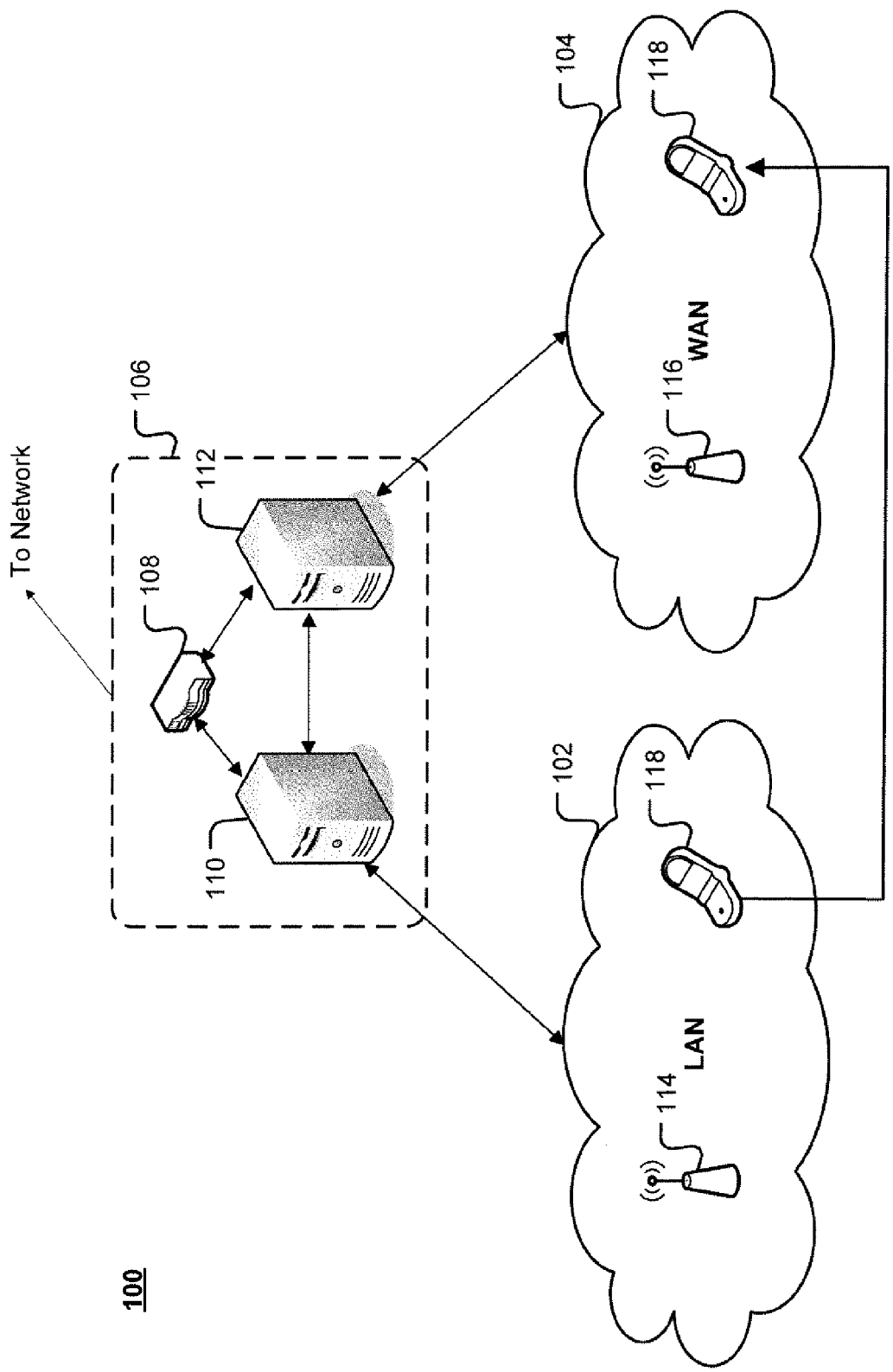
FIG. 2 illustrates an exemplary system for facilitating a dual-mode handoff from a local area network (LAN) to a wide area network (WAN) in accordance with an exemplary embodiment.

FIG. 2 illustrates an exemplary system 100 for facilitating a dual-mode handoff from a local area network (LAN) to a wide area network (WAN) in accordance with an exemplary embodiment. As illustrated in FIG. 2, the mobile user device 118 associated with a user may be located within a coverage range of the local area network (LAN) 102. The mobile user device 118 may be coupled to the local area network (LAN) access points 114. For example, the mobile user device 118 may be coupled to the local area network (LAN) access point 114 located near the mobile user device 118. Also, the mobile user device 118 may be coupled to the local area network (LAN) access point 114 having high signal strength. Further, the user associated with the mobile user device 118 may select a local area network (LAN) access point 114 to be associated with within the local area network (LAN) 102. The mobile user device 118 may periodically monitor the signal strength from the local area network (LAN) access point 114. For example, the mobile user device 118 may detect a signal transmitted by the local area network (LAN) access point 114 every second to verify whether the mobile user device 118 may enable a mobile user session (e.g., a telephone call). In the event that the mobile user device 118 may detect a signal strength from the local area network (LAN) access point 114 above a received signal strength indicator (RSSI), the mobile user device 118 may determine that the mobile user session may be enabled. However, in the event that the mobile user device 118 may detect a signal strength from the local area network (LAN) access point 114 below the received signal strength indicator (RSSI), the mobile user device 118 may determine that the mobile user session may not be enabled.

As illustrated in FIG. 2, the local area network (LAN) 102 may include the local area network (LAN) access point 114. Also, the local area network (LAN) 102 may include a plurality of local area network (LAN) access points 114 controlled by a controller (not shown). The local area network (LAN) access point 114 may transmit and/or receive a signal from the mobile user device 118. For example, the local area network (LAN) access point 114 may receive a request message signal (e.g., lack of association, establish an association and/or hand-off request) from the mobile user device 118. The local area network (LAN) access point 114 may relay the request message signal to the local area network (LAN) server 110. Also, the local area network (LAN) access point 114 may relay the request message signal to the controller (not shown). Thereafter, the controller (not shown) may relay the request message signal to the local area network (LAN) server 110.

Also, the local area network (LAN) access point 114 may periodically monitor a signal strength from the mobile user device 118. For example, the local area network (LAN) access point 114 may detect a signal strength transmitted by the mobile user device 118 every second to verify whether the mobile user device 118 may be outside a coverage range of the local area network (LAN) 102. In the event that the local area network (LAN) access point 114 detects a signal strength above the received signal strength indicator (RSSI), the local area network (LAN) access point 114 may determine that the mobile user device 118 may be within the coverage range of the local area network (LAN) 102. Also, in the event that the local area network (LAN) access point 114 detects a signal strength below the received signal strength indicator (RSSI), the local area network (LAN) access point 114 may determine that the mobile user device 118 may be outside or at an edge of the coverage range of the local area network (LAN) 102.

In addition, the local area network (LAN) access point 114 may receive a request message signal to start a disassociation timer. Also, in the event the local area network (LAN) access point 114 determines that the mobile user device 118 may be outside or at an edge of the coverage range of the local area network (LAN) 102, the local area network (LAN) access point 114 may start the disassociation timer. The disassociation timer may be set at a predetermined time period (e.g., 0.001-1 seconds). Also, the disassociation timer may be varied based at least in part on the detected signal strength from the mobile user device 118. For example, the disassociation timer may be set at a longer time period in the event that the detected signal strength from the mobile user device 118 may be slightly below the received signal strength indicator (RSSI) than in the event that the detected signal strength from the mobile user device 118 may be substantially below the received signal strength indicator.

Furthermore, the local area network (LAN) access point 114 may receive a lack of association (LoA) signal from the mobile user device 118. Also, the local area network (LAN) access point 114 may generate the lack of association (LoA) signal associated with the mobile user device 118. The local area network access point 114 may directly transfer the lack of association (LoA) signal to the local area network (LAN) server 110. Also, the local area network access point 114 may transfer the lack of association (LoA) signal to the local area network (LAN) server 110 via the controller (not shown). The lack of association (LoA) signal may inform the local area network (LAN) server 110 that the mobile user device 118 may be outside the coverage range of the local area network (LAN) 102. The local area network (LAN) server 110 may update a location register (not shown) containing a list of mobile user devices 118 that may be within the coverage range of the local area network (LAN) 102. The local area network (LAN) server 110 may disassociate the mobile user device 118 from the local area network (LAN) 102. Also, the local area network (LAN) server 110 may remove identification information (e.g., phone number, electronic serial number (ESN), and/or uniform resource locator (URL)) associated with the mobile user device 118 from the location register (not shown) containing the list of mobile user devices 118.

Additionally, the mobile user device 118 may be within a coverage range of a wide area network (WAN) 104, the mobile user device 118 may attempt to establish an association with the wide area network (WAN) 104 via wide area network (WAN) access points 116. The mobile user device 118 may provide the wide area network (WAN) access points 116 with the identification information associated with the mobile user device 118. In the event that the wide area network (WAN) 104 include a plurality of wide area network (WAN) access points 116. The wide area network (WAN) access point 116 may transfer the identification information associated with the mobile user device 118 to the wide area network (WAN) server 112 via the controller (not shown). Also, the wide area network (WAN) access points 116 may inform the wide area network (WAN) server 112 that a new mobile user device may have entered a coverage range of the wide area network (WAN) 104. The wide area network (WAN) server 112 may update a location register (not shown) including a list of mobile user devices 118 within the coverage range of the wide area network (WAN) 104.

The wide area network (WAN) server 112 may verify whether the mobile user device 118 may be capable of dual-mode operation in the local area network (LAN) 102 and the wide area network (WAN) 104 based at least in part on a request for hand-off signal provided by the mobile user device 118. For example, the request for hand-off signal provided by the mobile user device 118 may include identification information (e.g., phone number, electronic serial number (ESN), and/or uniform resource locator (URL)) associated with the mobile user device 118 and/or detected identification information associated with the wide area network (WAN) 104. For example, the wide area network (WAN) server 112 may look up a subscriber database (not shown) according to the identification information associated with the mobile user device 118. The subscriber database (not shown) may contain information associated with the dual mode operation of the mobile user device 118. The wide area network (WAN) server 112 may determine that the mobile user device 118 is capable of dual-mode operation in the local area network (LAN) 102 and the wide area network (WAN) 104. The wide area network (WAN) server 112 may inform the local area network (LAN) server 110 that the mobile user device 118 may not be within the coverage range of the local area network (LAN) 102 and the mobile user device 118 may have enter a coverage range of the wide area network (WAN) 104. For example, the wide area network (WAN) server 112 may provide the identification information associated with the mobile user device 118 to the local area network (LAN) server 110. Thereafter, the local area network (LAN) server 110 may remove the mobile user device 118 from the location register (not shown) based at least in part on the identification information provided by the wide area network (WAN) server 112. Also, the wide area network (WAN) server 112 may determine that the mobile user device 118 is not capable of dual-mode function in the local area network (LAN) 102 and the wide area network (WAN) 104. The wide area network (WAN) server 112 may reply to the mobile user device 118 with an error/warning message. The wide area network (WAN) server 112 may end the mobile user session.

Moreover, the local area network (LAN) server 110 and/or the wide area network (WAN) server 112 may update the router 108 that the mobile user device 118 may be outside the coverage range of the local area network (LAN) 102. Therefore, the router 108 may route a transmission of data from another network (not shown) to the appropriate network. Once the mobile user device 118 is associated with the wide area network (WAN) 116, the mobile user device 118 may continue the mobile user session via the wide area network (WAN) 104. Before being completely dropped from the local area network (LAN) 102, the mobile user device 118 may concurrently receive data transmission via the local area network (LAN) 102 and wide area network (WAN) 104.

Figure 3:
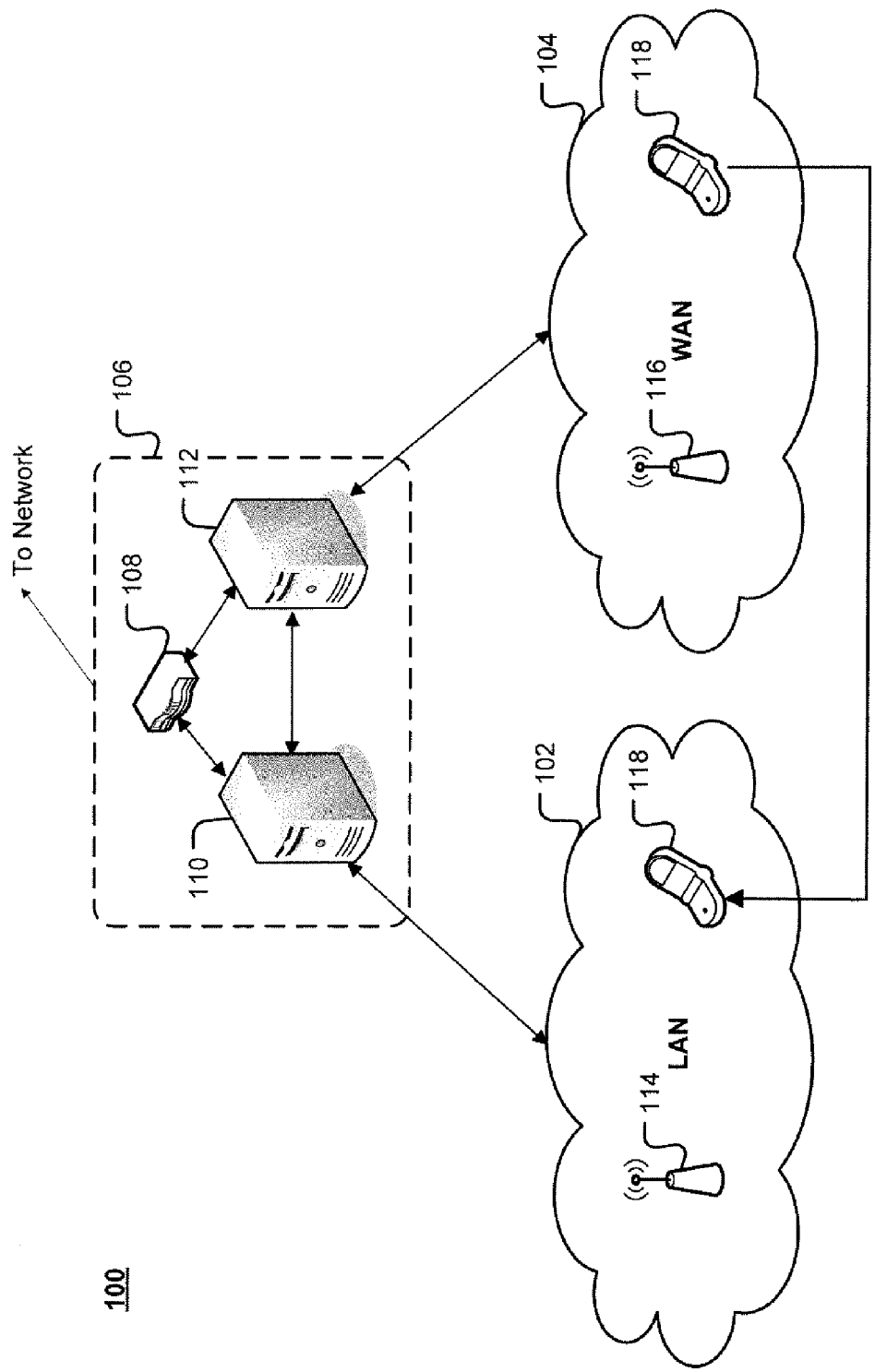
FIG. 3 illustrates an exemplary system for facilitating a dual-mode handoff from a wide area network (WAN) to a local area network (LAN) in accordance with an exemplary embodiment.

FIG. 3 illustrates an exemplary system 100 for facilitating a dual-mode handoff from a wide area network (WAN) to a local area network (LAN) in accordance with an exemplary embodiment. The mobile user device 118 may be associated with the wide area network (WAN) access points 116. The wide area network (WAN) 104 may associate identification information (e.g., phone number, electronic serial number (ESN), and/or uniform resource locator (URL)) with the mobile user device 118 via the wide area network (WAN) access points 116. The identification information associated with the mobile user device 118 may be stored and/or updated in the wide area network (WAN) server 112.

The wide area network (WAN) access points 116 may transmit and/or receive a signal from the mobile user device 118. For example, the wide area network (WAN) access point 116 may receive a request message signal (e.g., lack of association, establish an association and/or hand-off) from the mobile user device 118. The wide area network (WAN) access point 116 may relay the request message signal to the wide area network (WAN) server 112. Also, the wide area network (WAN) access point 116 may periodically detect signal strength from the mobile user device 118. For example, the wide area network (WAN) access point 116 may detect a signal transmitted by the mobile user device 118 every second to verify whether the mobile user device 118 is outside the coverage range of the wide area network (WAN) 104.

As illustrated in FIG. 3, the mobile user device 118 may move from a coverage range of the wide area network (WAN) 104 to a coverage range of the local area network (LAN) 102. For example, the mobile user device 118 may move from a coverage range of only the wide area network (WAN) 104 to a coverage range of only the local area network (LAN). Also, the mobile user device 118 may move from a coverage range of only the wide area network (WAN) 104 to a coverage range of both the wide area network (WAN) 104 and the local area network (LAN) 102. The mobile user device 118 may detect a signal from the local area network (LAN) 102. A variety of hand-off options from the wide area network (WAN) 104 to the local area network (LAN) 102 may be associated with the mobile user device 118. For example, the hand-off options associated with the mobile user device 118 may be selected by the user via an input module (e.g., number pad and/or keypad) associated with the mobile user device 118. Also, the user may access the wide area network (WAN) server 112 via a network (e.g., Internet) to select the hand-off options associated with the mobile user device 118. The wide area network (WAN) server 112 may update a list of the hand-off options associated with the mobile user device 118 stored in the wide area network (WAN) server 112. Also, the wide area network (WAN) server 112 may provide a default hand-off option associated with the mobile user device 118.

For example, the mobile user device 118 may be associated with an automatic hand-off option from the wide area network (WAN) 104 to the local area network (LAN) 102. For the automatic hand-off option, the mobile user device 118 may automatically hand off from the wide area network (WAN) 104 to the local area network (LAN) 102 based at least in part on the detected signal strength from the local area network (LAN) 102.

Also, the mobile user device 118 may be associated with a best-quality hand-off option from the wide area network (WAN) 104 to the local area network (LAN) 102. For the best-quality hand-off option, the mobile user device 118 may detect a signal strength from the wide area network (WAN) 104 and a signal strength from the local area network (LAN) 102. The mobile user device 118 may compare the signal strength from the wide area network (WAN) 104 with the signal strength from the local area network (LAN) 102. The mobile user device 118 may select to remain and/or hand-off to the network having the best quality signal strength. For example, the mobile user device 118 may determine the signal strength from the local area network (LAN) 102 may be stronger than the signal strength from the wide area network (WAN) 104. The mobile user device 118 may select to be handed-off from the wide area network (WAN) 104 to the local area network (LAN) 102.

Further, the mobile user device 118 may be associated with no hand-off option from the wide area network (WAN) 104 to the local area network (LAN) 102. For example, the mobile user device 118 may be in a coverage range of both the wide area network (WAN) 104 and the local area network (LAN) 102. The mobile user device 118 may not hand-off to the local area network (LAN) 102 even though the signal strength from the local area network (LAN) 102 may be stronger and maintain an association with the wide area network (WAN) 104.

Moreover, the mobile user device 118 may be associated with a dual-mode operation hand-off option from the wide area network (WAN) 104 to the local area network (LAN). For example, the mobile user device 118 may be in a coverage range of both the wide area network (WAN) 104 and the local area network (LAN) 102. The mobile user device 118 may establish association with both the wide area network (WAN) 104 and the local area network 102. The wide area network (WAN) 104 and the local area network (LAN) 102 may provide disparate services to the mobile user device 118. For example, the wide area network (WAN) 104 may provide a telephone service to the mobile user device 118 while the local area network (LAN) 102 may provide a data transmission service to the mobile user device 118.

The wide area network (WAN) access point 116 may transmit and/or receive a signal from the mobile user device 118. For example, the wide area network (WAN) access point 16 may receive a request message signal from the mobile user device 118. The wide area network (WAN) access point 116 may relay the request message signal to the wide area network (WAN) server 112. For example, the wide area network (WAN) 104 may include a plurality of wide area network (WAN) access points 116 controlled by a controller (not shown). The wide area network (WAN) access points 116 may relay the request message signal to the controller (not shown) and the controller (not shown) may relay the request message signal to the wide area network (WAN) server 112. Also, the wide area network (WAN) access point 116 may periodically detect a signal strength from the mobile user device 118. For example, the wide area network (WAN) access point 116 may detect a signal transmitted by the mobile user device 118 every microsecond to one second to verify whether the mobile user device 118 may be outside the coverage range of the wide area network (WAN) 104. In the event that the wide area network (WAN) access point 116 may detect a signal transmitted by the mobile user device 118 above a received signal strength indicator (RSSI) threshold, the wide area network (WAN) access point 116 may determine that the mobile user device 118 may be within the coverage range of the wide area network (WAN) 104. Also, in the event that the wide area network (WAN) access point 116 may detect a signal transmitted by the mobile user device 118 below the received signal strength indicator (RSSI) threshold, the wide area network (WAN) access point 116 may determine that the mobile user device 118 may be outside or at a perimeter of the coverage range of the wide area network (WAN) 104.

In addition, in the event the wide area network (WAN) access point 116 may determine that the mobile user device 118 may be outside or at a perimeter portion of the coverage range of the wide area network (WAN) 104, the mobile user device 118 may automatically search for a local area network (LAN) 102 signal. Also, the wide area network (WAN) access point 116 may instruct the mobile user device 118 to search for the local area network (LAN) 102 signal. The mobile user device 118 may detect a signal from the local area network (LAN) 102. Also, the wide area network (WAN) access point 116 may inform the wide area network (WAN) server 112 that the mobile user device 118 may be outside the coverage range of the wide area network (WAN) 104. The location register (not shown) located at the wide area network (WAN) server 112 may update a list of mobile user device 118 that may be located in the wide area network (WAN) 104. The wide area network (WAN) server 112 may disassociate the mobile user device 118 from the wide area network (WAN) 104. Also, the wide area network (WAN) server 112 may remove the mobile user device 118 record from the list of mobile user devices 118 that may be located in the wide area network (WAN) server 112.

Further, the wide area network (WAN) server 112 may inform the local area network (LAN) server 110 that the mobile user device 118 may not be within the coverage range of the wide area network (WAN) 104 and the mobile user device 118 may have enter the coverage range of the local area network (LAN) 102. For example, the wide area network (WAN) server 112 may provide the identification information associated with the mobile user device 118 to the local area network (LAN) server 110.

Moreover, the wide area network (WAN) server 112 may inform the router 108 that the mobile user device 118 may be outside the coverage range of the wide area network (WAN) 104. The router 108 may determine that the mobile user device 108 may be outside the coverage range of the wide area network (WAN) 104 and may route data associated with the mobile user device 108 to the local area network (LAN) server 110. Also, the router 108 may inform local area network (LAN) server 110 that a new mobile user device 118 have entered a coverage range the local area network (LAN) 102. The router 108 may provide the identification information associated with the mobile user device 118 to the local area network (LAN) server 110.

In addition, the mobile user device 118 may provide the identification information associated with the mobile user device 118 to the local area network (LAN) access point 114. The local area network (LAN) access point 114 may relay the identification information associated with the mobile user device 118 to the local area network (LAN) server 110. As discussed above, the local area network (LAN) server 110 may verify that the mobile user device 118 may be capable of dual-mode operation in the local area network (LAN) 102 and the wide area network (WAN) 104. For example, the local area network (LAN) server 110 may look up a subscriber database (not shown) according to the identification information associated with the mobile user device 118. The subscriber database (not shown) may contain information associated with the dual-mode operation and/or handoff option of the mobile user device 118. For example, the local area network (LAN) server 110 may determine that the mobile user device 118 may be capable of dual-mode operation in the local area network (LAN) 102 and the wide area network (WAN) 104. The mobile user device 118 may automatically establish an association with the local area network (LAN) access points 114. Also, the local area network (LAN) server 110 may instruct the local area network (LAN) access points 114 to establish an association with the mobile user device 118. Also, the local area network (LAN) server 110 may determine that the mobile user device 118 may not be capable of dual-mode function in local area network (LAN) 102 and the wide area network (WAN) 104. The local area network (LAN) server 110 may provide the mobile user device 118 with an error/warning message. The local area network (LAN) server 110 may not provide the mobile user device 118 with an error/warning message and may not establish an association with the mobile user device 118.

Also, the local area network server 110 may provide the identification information associated with the mobile user device 118 to the local area network (LAN) access points 114. The local area network (LAN) access points 114 may attempt to locate a mobile user device 118 that may match the identification information associated with the mobile user device 118 provided by the local area network (LAN) server 110. Once the mobile user device 118 may be associated with the local area network (LAN) 102, the mobile user device 118 may continue the mobile user session via the local area network (LAN) 102. Before being completely dropped from the wide area network (WAN) 104, the mobile user device 118 may concurrently receive data via the local area network (LAN) 102 and wide area network (WAN) 104.

Figure 4:
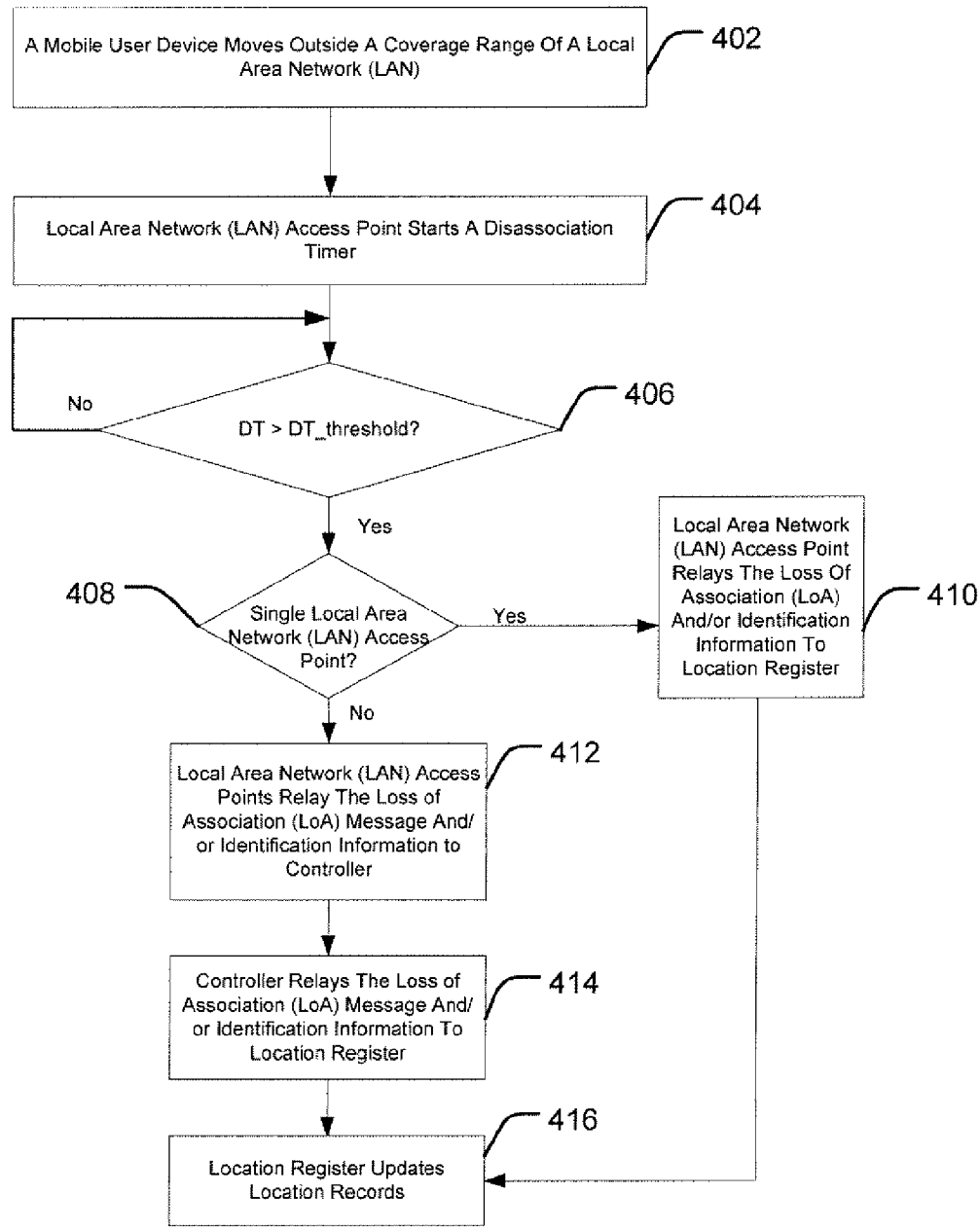
FIG. 4 is an exemplary flowchart illustrating a process of dual-mode hand-off from a local area network (LAN) to a wide area network (WAN) with a mobile user device in the inactive mode, according to an exemplary embodiment.

FIG. 4 is an exemplary flowchart illustrating a process of dual-mode hand-off from a local area network (LAN) to a wide area network (WAN) with a mobile user device in the inactive mode, according to an exemplary embodiment. This exemplary method 400 is provided by way of example, as there are a variety of ways to carry out the method. The method 400 shown in FIG. 4 can be executed or otherwise performed by one or a combination of various systems. The method 400 is described below may be carried out by system 100 shown in FIG. 1 by way of example, and various elements of the system 100 are referenced in explaining the exemplary method of FIG. 4. Each block shown in FIG. 4 represents one or more processes, methods or subroutines carried in exemplary method 400. A computer executable media having instructions to perform the method 400 may also be provided. Referring to FIG. 4, exemplary method 400 may begin at block 402.

At block 402, a mobile user device 118 may move outside a coverage range of a local area network (LAN) 102. For example, the mobile user device 118 may be in the inactive mode and may be within the coverage range of and/or associated with a local area network (LAN) access points 114. The mobile user device 118 may move outside of the coverage range of the local area network (LAN) access points 114 and/or becoming disassociated with the local area network (LAN) access points 114. For example, the local area network (LAN) access points 114 may detect the signal strength from the mobile user device 118 to be below a receives signal strength indicator (RSSI). In this event, the local area network (LAN) access points 114 may determine that the mobile user device 118 may be outside the coverage range of the local area network (LAN) 102. After the mobile user device 118 move outside a coverage range of a local area network (LAN) 102, the method 400 may proceed to block 404.

At block 404, the local area network (LAN) access points 114 may start a disassociation timer. For example, the mobile user device 118 may have moved outside or to a perimeter of the coverage range of the local area network (LAN) 102. Also, the mobile user device 118 may disassociate with the local area network (LAN) access points 114. The local area network (LAN) access points 114 may start the disassociation timer. The disassociation timer may be based at least in part on the radio characteristics (e.g., frequency, phase, amplitude, etc.) of the channel utilized by the mobile user device 118. After the local area network (LAN) access points 114 may start the disassociation timer, the method 400 may proceed to block 406.

At block 406, the disassociation timer may monitor/determine whether the amount of time the mobile user device 118 may be disassociated with the local area network (LAN) access points 114 (DT) may exceed a predetermined disassociation threshold time (DT-Threshold). In the event that, the amount of time the mobile user device 118 may be disassociated with the local area network (LAN) access points 114 may not exceed the predetermined disassociation threshold time, the mobile user device 118 may attempt to reestablish an association with the local area network (LAN) access points 114. Also in the event that, the amount of time the mobile user device 118 may be disassociated with the local area network (LAN) access points 114 may exceed the predetermined disassociation threshold time, the mobile user device 118 may provide a loss of association message (LoA) and/or identification information (e.g., phone number, electronic serial number (ESN), and/or uniform resource locator (URL)) associated with the mobile user device 118 to a location register located at a local area network (LAN) server 110 via the local area network access points 114. After the determination of whether the amount of time the mobile user device 118 may be disassociated with the local area network (LAN) access points 114 may or may not exceed the predetermined disassociation threshold time, the method of 400 may proceed to block 408.

At block 408, the local area network (LAN) access points 114 may determine whether the local area network (LAN) access points 114 may be controlled by a controller. For example, the local area network 102 may include a single local area network (LAN) access point 114 and the single local area network (LAN) access point 114 may not be controlled by a controller, then the method of 400 may proceed to block 410. Also for example, the local area network 102 may include a plurality of local area network (LAN) access points 114 that may be controlled by a controller, then the method of 400 may proceed to block 412.

At block 410, the local area network (LAN) access points 114 may relay the loss of association (LoA) message and/or the identification information associated with the mobile user device 118 directly to the location register located at the local area network (LAN) server 110.

At block 412, the local area network (LAN) access points 114 may relay the loss of association (LoA) message and/or the identification information associated with the mobile user device 118 to the controller. After, the local area network (LAN) access points 114 sent the loss of association (LoA) message and/or the identification information associated with the mobile user device 118 to the controller, the method 400 may proceed to block 414.

At block 414, the controller may relay the loss of association (LoA) message and/or the identification information associated with the mobile user device 118 to the location register located at the local area network (LAN) server 110. For example, the controller may directly relay the loss of association (LoA) message and/or the identification information associated with the mobile user device 118 to the location register at the local area network (LAN) server 110. Also, the controller may process the loss of association (LoA) message and/or the identification information associated with the mobile user device 118 before transmitting to the location register located at the local area network (LAN) server 110. For example, the controller may encode and/or verify the loss of association (LoA) message and/or the identification information associated with the mobile user device 118 before relaying to the location register located at the local area network (LAN) server 110. After the controller relay the loss of association (LoA) message and/or the identification information associated with the mobile user device 118 to the location register at the local area network (LAN) server 110, the method may proceed to block 416.

At block 416, the location register located at the local area network (LAN) server 110 may update a location record associated with the mobile user device 118. The location register located at the local area network (LAN) server 110 may receive the lack of association (LoA) message and/or the identification information associated with the mobile user device 118 from the local area network (LAN) access points 114 or the controller. The location register may update a location record based at least in part on the identification information associated with the mobile user device 118. The location register located at the local area network (LAN) server 110 may identify the mobile user device 118 within the location record based on the identification information associated with the mobile user device 118 and/or remove the mobile user device 118 from the location record. For example, the location register located at the local area network (LAN) server 110 may search for the mobile user device 118 in the location record based at least in part on the identification information associated with the mobile user device 118. After identifying the mobile user device 118, the location register located at the local area network (LAN) server 110 may remove the mobile user device 118 from the location record stored in the local area network (LAN) server 110.

Also at block 416, the local area network (LAN) server 110 may verify whether the mobile user device 118 may be capable of dual-mode operation in the local area network (LAN) 102 and a wide area network (WAN) 104 using a subscriber database (not shown). The local area network (LAN) server 110 may provide the identification information associated with the mobile user device 118 in the local area network (LAN) 102 to a wide area network (WAN) server 112. Also, the local area network (LAN) server 110 may update the location record that the mobile user device 118 may be moved to the coverage range of the wide area network (WAN) 104. Furthermore, the local area network (LAN) server 110 may inform a router 108 that the mobile user device 118 is no longer associated with the local area network (LAN) 102.

Figure 5:
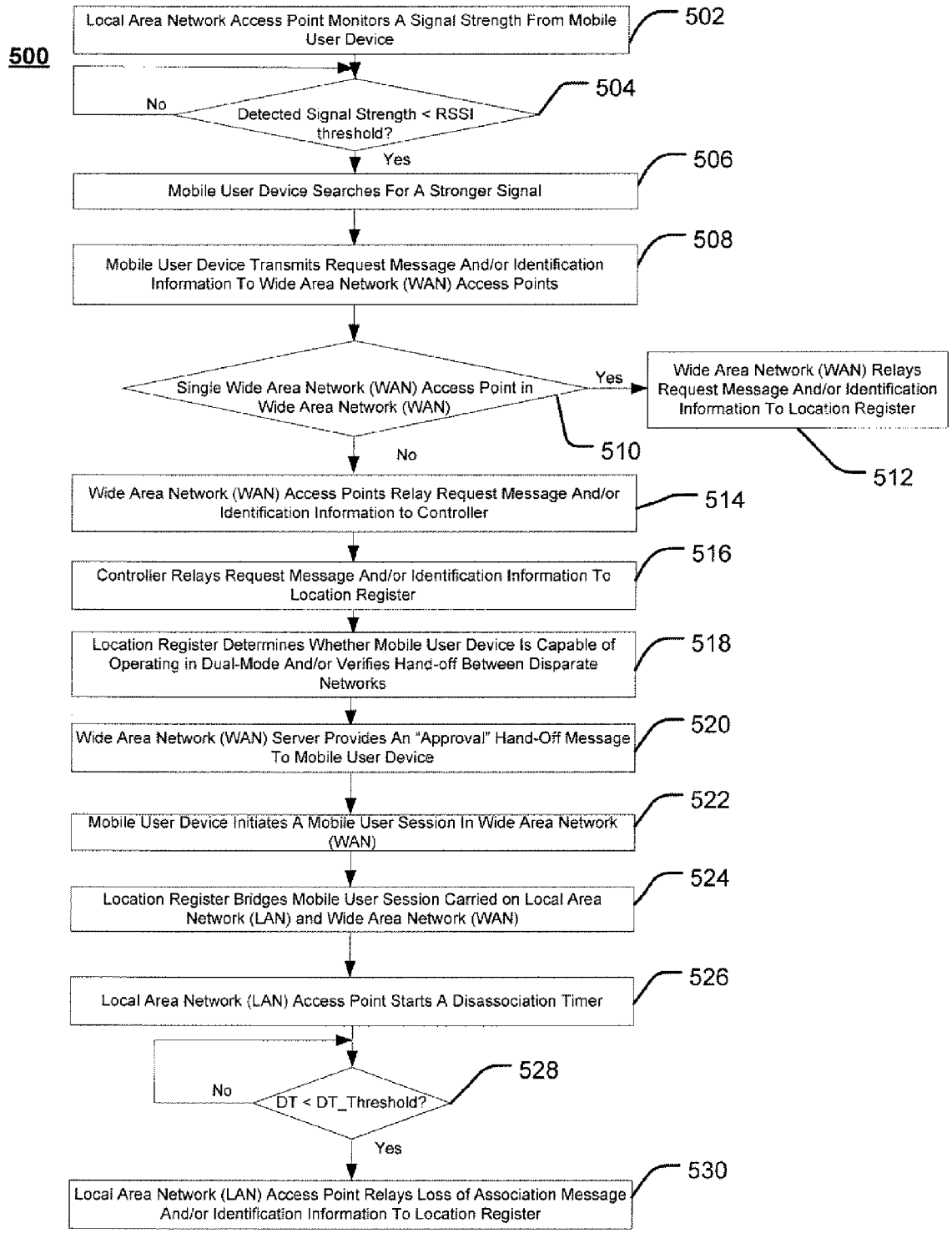
FIG. 5 is an exemplary flowchart illustrating a process of dual-mode hand-off from a local area network (LAN) to a wide area network (WAN) with a mobile user device in the active mode, according to an exemplary embodiment.

FIG. 5 is an exemplary flowchart illustrating a process of dual-mode hand-off from a local area network (LAN) to a wide area network (WAN) with a mobile user device in the active mode, according to an exemplary embodiment. This exemplary method 500 is provided by way of example, as there are a variety of ways to carry out the method. The method 500 shown in FIG. 5 can be executed or otherwise performed by one or a combination of various systems. The method 500 is described below may be carried out by system 100 shown in FIG. 1 by way of example, and various elements of the system 100 are referenced in explaining the exemplary method of FIG. 5. Each block shown in FIG. 5 represents one or more processes, methods or subroutines carried in exemplary method 500. A computer executable media having instructions to perform the method 500 may also be provided. Referring to FIG. 5, exemplary method 500 may begin at block 502.

At block 502, a local area network (LAN) access points 114 may monitor a signal strength associated with a mobile user device 118. For example, a mobile user device 118 may be associated with a user. The mobile user device 118 may be associated with local area network (LAN) 102 via the local area network (LAN) access points 114. Also, the mobile user device 118 may be associated with identification information (e.g., phone number, electronic serial number (ESN), and/or uniform resource locator (URL)) to distinguish the mobile user device 118 from other mobile user devices 118 within the local area network (LAN) 102. The local area network (LAN) access points 114 may be in communication with the mobile user device 118 to identify a location of the mobile user device 118. The mobile user device 118 may be operating in an active mode (e.g., during a phone call) to transmit/receive a signal from the local area network (LAN) access points 114. The local area network (LAN) access points 114 may monitor a signal strength from the mobile user device 118. For example, the local area network (LAN) access points 114 may detect the signal strength from the mobile user device 118 periodically (e.g., 0.001 to 1 second). The mobile user device 118 may have moved outside or to an perimeter of the coverage range of the local area network (LAN) 102. The local area network (LAN) access points 114 may detect a degradation of a signal strength associated with the mobile user device 118. After the local area network (LAN) access points 14 may detect a signal strength associated with a mobile user device 118, the method 500 may proceed to block 504.

At block 504, the detected signal strength from the mobile user device 118 may be compared to a received signal strength indicator (RSSI) threshold. For example, the received signal strength indicator (RSSI) threshold may be defined by the sum of a minimum signal strength and a predetermined marginal signal strength. Also, the minimum signal strength may be defined by the minimum signal strength to enable/maintain an active mode of the mobile user device 118. In the event that the signal strength from the mobile user device 118 may be above the received signal strength indicator (RSSI) threshold, the mobile user device 118 may continue to monitor the signal strength from the mobile user device 118. In the event that the detect signal strength from the mobile user device 118 may be below the received signal strength indicator (RSSI) threshold, the method of 500 may proceed to block 506.

At block 506, the mobile user device 118 may search for a stronger signal. For example, the mobile user device 118 may move to outside a coverage range or a perimeter portion of the local area network (LAN) 102. The local area network (LAN) access points 114 may instruct the mobile user device 118 to search for a stronger signal to continue a mobile user session. The mobile user device 118 may detect a stronger signal from a wide area network (WAN) 104. For example, the mobile user device 118 may detect a signal from a wide area network (WAN) access point 116. The mobile user device 118 may attempt to establish an association with the wide area network (WAN) access point 116. After the mobile user device 118 may search for a stronger signal, the method of 500 may proceed to block 508.

At block 508, the mobile user device 118 may transmit a request message for dual-mode handoff and/or identification information (e.g., phone number, electronic serial number (ESN), and/or uniform resource locator (URL)) associated with the mobile user device 118 to the wide area network (WAN) access point 116. Also, the mobile user device 118 may have transmitted the identification information associated with the mobile user device 118 to the wide area network (WAN) access point 116 in a previous communication. Further, the mobile user device 118 may transmit a request message for dual-mode hand-off to the wide area network (WAN) access point 116. After the mobile user device 118 may transmit a request message for dual-mode handoff and/or identification information associated with the mobile user device 118 to the wide area network (WAN) access point 116, the method 500 may proceed to block 510.

At block 510, the wide area network (WAN) access points 116 may determine whether the wide area network (WAN) access point 116 may be controlled by a controller. For example, the wide area network (WAN) 104 may include a single wide area network (WAN) access point 116 and the wide area network (WAN) access point 116 may not be controlled by a controller, then the method of 500 may proceed to block 512. Also for example, the wide area network (WAN) 104 may include a plurality of wide area network (WAN) access points 116 that may be controlled by a controller, then the method of 500 may proceed to block 514.

At block 512, the wide area network (WAN) access point 116 may relay the request message for dual-mode hand-off and/or identification information associated with the mobile user device 118 directly to a location register located at the wide area network (WAN) server 112.

At block 514, the wide area network (WAN) access points 116 may relay the request message for dual-mode mode hand-off and/or identification information associated with the mobile user device 118 to a controller. For example, the wide area network (WAN) access points 116 may relay the request message for dual-mode mode hand-off and/or identification information associated with the mobile user device 118 to the controller, the method of 500 may proceed to 516.

At block 516, the controller may relay the request message for dual-mode mode hand-off and/or identification information associated with the mobile user device 118 to a location register located at a wide area network (WAN) server 112. For example, the controller associated with the wide area network (WAN) 104 may directly relay the request message for dual-mode mode hand-off and/or the identification information associated with the mobile user device 118 to the location register located at the wide area network (WAN) server 112. Also, the controller associated with the wide area network (WAN) 104 may process the request message for dual-mode hand-off and/or identification information associated with the mobile user device 118 before relaying to the location register located at the wide area network (WAN) server 112. For example, the controller may encode/format the request message for dual-mode handoff and/or identification information associated with the mobile user device 118. After the controller may relay the request message for dual-mode mode hand-off and/or identification information associated with the mobile user device 118 to the location register located at the wide area network (WAN) server 112, the method of 500 may proceed to block 518.

At block 518, the location register located at the wide area network (WAN) server 112 may determine whether the mobile user device 118 may be capable of operating in dual-mode and/or verify hand-off between disparate networks. For example, the wide area network (WAN) server 112 may look up a subscriber database (not shown) based at least in part on the identification information associated with the mobile user device 118. The subscriber database (not shown) may contain information associated with the dual-mode operation and/or hand-off option associated with the mobile user device 118. The location register located at the wide area network (WAN) server 112 may verify the request message for dual-mode handoff may be associated with valid mobile user device 118. Also, the wide area network (WAN) server 112 may determine that the mobile user device 118 may not be capable of dual-mode operation in local area network (LAN) 102 and the wide area network (WAN) 104. The wide area network (WAN) server 112 may provide the mobile user device 118 with an error/warning message. Also, the wide area network (WAN) server 112 may not provide the mobile user device 118 with an error/warning message and end the mobile user session. Further, the location register located at the wide area network (WAN) server 112 may determine that the mobile user device 118 may be capable of operating in dual-mode and/or verify hand-off between disparate networks, then the method of 500 may proceed to block 520.

At block 520, the wide area network (WAN) server 112 may provide an "approval" handoff message to the mobile user device 118. For example, the approval handoff message for to the mobile user device 108 may be transmitted by the wide area network (WAN) server 112 via the wide area network (WAN) access point 116. Also, the approval handoff message to the mobile user device 118 may be transmitted by the wide area network (WAN) server 112 via the local area network (LAN) server 110 and/or the local area network (LAN) access points 114. After the wide area network (WAN) server 112 may provide an "approval" handoff message to the mobile user device 118, the method 500 may proceed to block 522.

At block 522, the mobile user device 118 may initiate the mobile user session (e.g., places a call to the same party that the user was already talking to) in the wide area network (WAN) 104 based at least in part on the identification information associated with the mobile user device 118. The mobile user device 118 may establish an association with the wide area network (WAN) 104 via the wide area network (WAN) access point 116. Also, the mobile user device 118 may initiate the mobile user session over the wide area network (WAN) 104 via the wide area network (WAN) access points 116. After, the mobile user device 118 may initiate the mobile user session, the method 500 may proceed to block 524.

At block 524, the location register located at the wide area network (WAN) server 112 may bridge the mobile user session carried on the local area network (LAN) 102 and the wide area network (WAN) 104. For example, the wide area network (WAN) access point 116 may provide the mobile user session request message and/or call-processing message to the location register located at the wide area network (WAN) server 112. Further, the wide area network (WAN) server 112 may update a list of mobile user device 118 in the wide area network (WAN) 104. The mobile user device 118 may transmit/receive data from the local area network (LAN) 102 and the wide area network (WAN) 104. A router 108 may mange the transmission/reception of data to and/or from the mobile user device 118 via the local area network (LAN) 102 and the wide area network (WAN) 104. After, the location register located at the wide area network (WAN) server 112 may bridge the mobile user session carried on the local area network (LAN) 102 and the wide area network (WAN) 104, the method 500 may move to block 526.

At block 526, the local area network (LAN) access points 114 may lose an association with the local area network (LAN) 102 and/or start a disassociation timer. For example, the mobile user device 118 may move outside of the coverage range of the local area network (LAN) access points 114 and/or become disassociated with the local area network (LAN) access points 114. For example, the detected signal strength from the mobile user device 118 may be below the received signal strength indicator (RSSI) threshold, the local area network (LAN) access point 114 may start the disassociation timer. The disassociation timer may be based at least in part on the radio characteristic of the channel utilized by the mobile user device 118. After the local area network (LAN) access points 114 may start the disassociation timer, the method 500 may proceed to block 528.

At block 528, the disassociation timer may monitor/determine whether the amount of time the mobile user device 118 may be disassociated with the local area network (LAN) access points 114 (DT) may exceed a predetermined disassociation threshold time (DT-Threshold). In the event that, the amount of time the mobile user device 118 may be disassociated with the local area network (LAN) access points 114 may not exceed the predetermined disassociation threshold time, the mobile user device 118 may attempt to reestablish an association with the local area network (LAN) access points 114. Also in the event that, the amount of time the mobile user device 118 may be disassociated with the local area network (LAN) access points 114 may exceed the predetermined disassociation threshold time, the mobile user device 118 may provide a loss of association message (LoA) and/or identification information (e.g., phone number, electronic serial number (ESN), and/or uniform resource locator (URL)) associated with the mobile user device 118 to a location register located at a local area network (LAN) server 110 via the local area network access points 114. After the determination of whether the amount of time the mobile user device 118 may be disassociated with the local area network (LAN) access points 114 may or may not exceed the predetermined disassociation threshold time, the method of 500 may proceed to block 530.

At block 530, the local area network (LAN) access point 114 may relay the loss of association (LoA) message and/or the identification information associated with the mobile user device 118 to the location register located at the local area network (LAN) server 110. For example, the local area network (LAN) 102 may include a single local area network (LAN) access point 114 and the single local area network (LAN) access point 114 may not be controlled by a controller. The local area network (LAN) access points 114 may relay the loss of association (LoA) message and/or the identification information associated with the mobile user device 118 directly to the location register located at the local area network (LAN) server 110.

Also at block 530, the local area network (LAN) 102 may include a plurality of local area network (LAN) access points 114 that may be controlled by a controller. The local area network (LAN) access points 114 may relay the loss of association (LoA) message and/or the identification information associated with the mobile user device 118 to the controller. Further the controller may relay the loss of association (LoA) message and/or the identification information associated with the mobile user device 118 to the location register at the local area network (LAN) server 110. For example, the controller may directly transfer the loss of association (LoA) message and/or the identification information associated with the mobile user device 118 to the location register at the local area network (LAN) server 110. Also, the controller may process/format the loss of association (LoA) message and/or the identification information associated with the mobile user device 118 before transmitting to the location register located at the local area network (LAN) server 110. For example, the controller may encode and/or verify the loss of association (LoA)

message and/or the identification information associated with the mobile user device 118 before transmitting the processed loss of association (LoA) message and/or the identification information associated with the mobile user device 118 to the location register located at the local area network (LAN) server 110.

Further at block 530, the location register located at the local area network (LAN) server 110 may update a location record associated with the mobile user device 118. The local area network (LAN) server 110 may receive the loss of association (LoA) message from the local area network (LAN) access points 114 or the controller and may update a location record associated with the mobile user device 118. For example, the local area network (LAN) server 110 may remove the mobile user device 118 from the location record. The local area network (LAN) server 110 may search for the mobile user device 118 in the location record based at least in part on the identification information associated with the mobile user device 118. The local area network (LAN) server 110 may remove the mobile user device 118 record from the location record stored in the local area network (LAN) server 110. Also, the local area network (LAN) server 110 may verify using a subscriber database (not shown) that the mobile user device 118 may be capable of dual-mode operation in the local area network (LAN) and a wide area network (WAN) 104. The local area network (LAN) server 110 may provide the identification information associated with the mobile user device 118 to the wide area network (WAN) server 112. Also, the local area network (LAN) server 110 may update the location record that the mobile user device 118 may be located in the wide area network (WAN) 104. Further, the local area network (LAN) server 110 may inform a router 108 that the mobile user device 118 is no longer associated with the local area network (LAN) 102.

Figure 6:
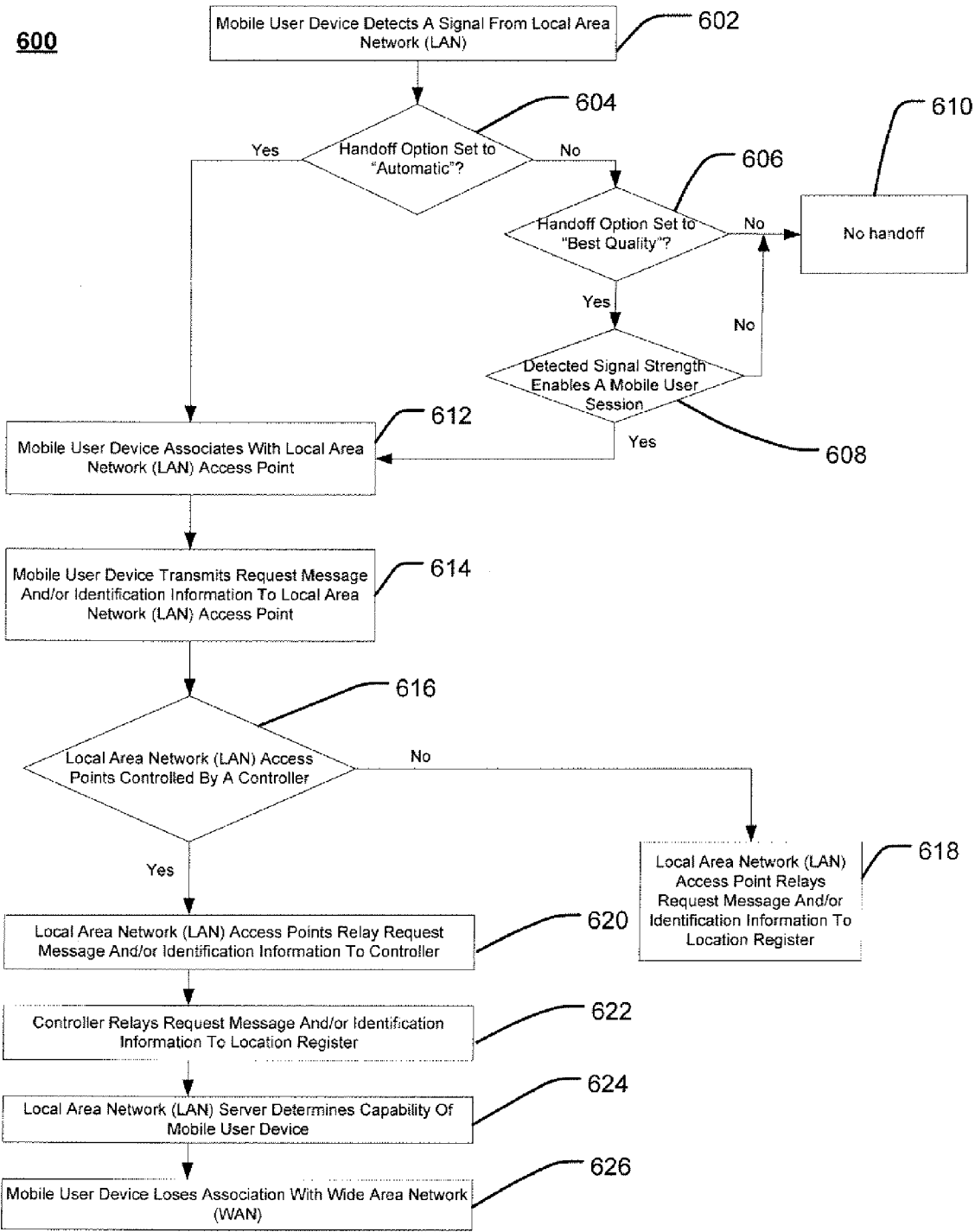
FIG. 6 is an exemplary flowchart illustrating a process of dual-mode hand-off from a wide area network (WAN) to a local area network (LAN) with a mobile user device in the inactive mode, according to an exemplary embodiment.

FIG. 6 is an exemplary flowchart illustrating a process of dual-mode hand-off from a wide area network (WAN) 104 to a local area network (LAN) 102 with a mobile user device in the inactive mode, according to an exemplary embodiment. This exemplary method 600 is provided by way of example, as there are a variety of ways to carry out the method. The method 600 shown in FIG. 6 can be executed or otherwise performed by one or a combination of various systems. The method 600 is described below may be carried out by system 100 shown in FIG. 1 by way of example, and various elements of the system 100 are referenced in explaining the exemplary method of FIG. 6. Each block shown in FIG. 6 represents one or more processes, methods or subroutines carried in exemplary method 600. A computer executable media having instructions to perform the method 600 may also be provided. Referring to FIG. 6, exemplary method 600 may begin at block 602.

At block 602, a mobile user device 118 associated with a wide area network (WAN) 104 may detect a signal from a local area network (LAN) 102. For example, the mobile user device 118 associated with the wide area network (WAN) 104 may move from a coverage range of only the wide area network (WAN) 104 to a coverage range of only the local area network (LAN) 102. Also, the mobile user device 118 associated with the wide area network (WAN) 104 may move from a coverage range of only the wide area network (WAN) 104 to a coverage range of both the wide area network (WAN) 104 and the local area network (LAN) 102. In the event that the mobile user device 118 may be within a coverage range of the local area network (LAN) 102, the mobile user device 118 may detect a signal from the local area network (LAN) 102. After, the mobile user device 118 associated with the wide area network (WAN) may detect a signal from a local area network (LAN) 102, the method 600 may proceed to block 604.

At block 604, the mobile user device 118 may determine whether the hand-off option may be set to automatic hand-off option. For example, a variety of hand-off options from the wide area network (WAN) 104 to the local area network (LAN) 102 may be associated with the mobile user device 118. The hand-off option associated with the mobile user device 118 may be selected by a user via an input module (e.g., number pad and/or keypad) associated with the mobile user device 118. Further, the user may access the wide area network (WAN) server 112 via a network (e.g., Internet) to select the hand-off option associated with the mobile user device 118. The wide area network (WAN) server 112 may update a list of the hand-off option associated with the mobile user device 118 stored in the wide area network (WAN) server 112. Also, the wide area network (WAN) server 112 may provide a default hand-off option to the mobile user device 118 to update the hand-off option associated with the mobile user device 118. The mobile user device 118 may determine whether the automatic hand-off option is associated with the hand-off option of the mobile user device 118. In the event that the hand-off option associated with the mobile user device 118 may be set to automatic handoff option, the method 600 may proceed to block 612. In the event that the hand-off option associated with the mobile user device 118 may not set to automatic handoff option, the method 600 may proceed to block 606.

At block 606, the mobile user device 118 may determine whether the hand-off option associated with the mobile user device 118 may be set to a best-quality hand-off option from the wide area network (WAN) 104 to the local area network (LAN) 102. The mobile user device 108 may detect a signal strength from the wide area network (WAN) 104 and a signal strength from the local area network (LAN) 102. The mobile user device 108 may compare the detected signal strength from the wide area network (WAN) 104 with the detected signal strength from the local area network (WAN) 102. The mobile user device 108 may determine the detected signal strength from the local area network (LAN) 102 may be stronger than the detected signal strength from the wide area network (WAN) 104. In the event that the hand-off option associated with the mobile user device 118 may not set to the best-quality hand-off option, the mobile user device 118 may not hand off, as illustrated at block 610. The mobile user device 118 may not hand-off to the local area network (LAN) 102 and maintain the association with the wide area network (WAN) 104. In the event that the hand-off option associated with the mobile user device 118 may set to the best-quality hand-off option, the method 600 may proceed to block 608.

At block 608, the mobile user device 118 may determine whether the detected signal strength from the local area network (LAN) 102 may enable a mobile user session (e.g., places a call to the same party that the user was already talking to). For example, a predetermined minimum signal strength may be associated to enable the mobile user session. The mobile user device 118 may compare the detected signal strength from the local area network (LAN) 102 with the predetermined minimum signal strength to enable the mobile user session. In the event that the detected signal strength from the local area network (LAN) 102 may be below the predetermined minimum signal strength associated to enable the mobile user session. The mobile user device 118 may not hand-off to the local area network (LAN) 102, as illustrated in block 610. In the event that the detected signal strength from the local area network (LAN) 102 may be above the predetermined minimum signal strength associated with enabling the mobile user session, the method 600 may proceed to block 612.

At block 612, the mobile user device 118 may associate with the local area network (LAN) access points 114. For example, the local area network 102 may include one local area network (LAN) access point 114. The mobile user device 118 may establish an association with the local area network (LAN) access point 114. Also, the local area network 102 may include a plurality of local area network (LAN) access points 114. The mobile user device 118 may detect the plurality of local area network signals from the plurality of local area network (LAN) access points 114. For example, the mobile user device 118 may establish an association with an adjacent local area network (LAN) access point 114. Also, the mobile user device 118 may establish an association with the local area network (LAN) access point 114 that may provide the strongest signal. Further, the user associated with the mobile user device 118 may select an association with the plurality of the local area network (LAN) access points 114. After the mobile user device 118 may associate with the local area network (LAN) access points 114, the method 600 may proceed to block 614.

At block 614, the mobile user device 118 may transmit a request message for dual-mode hand-off message and/or the identification information (e.g., phone number, electronic serial number (ESN), and/or uniform resource locator (URL)) associated with the mobile user device 118 to the local area network (LAN) access points 114. Also, the mobile user device 118 may have transmitted the identification information to the local area network (LAN) access points 114 in a pervious communication. Further, the mobile user device 118 may transmit a request message for dual-mode hand-off to the local area network (LAN) access points 114. After the mobile user device 118 may transmit a request message for dual-mode hand-off and/or the identification information associated with the mobile user device 118 to the local area network (LAN) access points 114, the method 600 may proceed to block 616.

At block 616, the local area network (LAN) access points 114 may determine whether the local area network (LAN) access points 114 may be controlled by a controller. As mentioned above, the local area network (LAN) 102 may include a single local area network (LAN) access point 114 and the single local area network (LAN) access point 114 may not be controlled by a controller, then the method of 600 may proceed to block 618. Also for example, the local area network (LAN) 102 may include the plurality of local area network (LAN) access points 114 that may be controlled by one or more controllers, then the method of 600 may proceed to block 620.

At block 618, the local area network (LAN) access point 114 may relay the request message for dual-mode hand-off and/or identification information associated with the mobile user device 118 directly to a location register located at the local area network (LAN) server 110.

At block 620, the local area network (LAN) access points 114 may relay the request message for dual-mode hand-off and/or identification information associated with the mobile user device 118 to one or more controllers. For example, after the local area network (LAN) access points 114 may send the request message for dual-mode mode hand-off and/or identification information associated with the mobile user device 118 to one or more controllers, the method of 600 may proceed to 622.

At block 622, the one or more controllers may relay the request message for dual-mode mode hand-off and the identification information associated with the mobile user device 118 to a location register located at a local area network (LAN) server 110. For example, the one or more controllers associated with the local area network (LAN) 102 may directly relay the request message for dual-mode mode hand-off and the identification information associated with the mobile user device 118 to the location register located at the local area network (LAN) server 110. Also, the one or more controllers associated with the local area network 102 may process and/or format the request message for dual-mode hand-off and/or the identification information associated with the mobile user device 118 before relaying to the location register located at the local area network (LAN) server 110. The location register located at the local area network (LAN) server 110 may provide the request message for dual-mode mode hand-off and/or the identification information associated with the mobile user device 118 to the location register located at the wide area network (WAN) server 112 to update the mobile user device 118 location. After the one or more controllers associated with the local area network (LAN) 102 may relay the request message for dual-mode mode hand-off and/or the identification information associated with the mobile user device 118 to the location register located at the local area network (LAN) server 110, the method of 600 may proceed to block 624.

At block 624, the location register located at the local area network (LAN) server 110 may determine whether the mobile user device 118 may be capable of operating in dual-mode and/or hand-off between disparate networks. For example, the local area network (LAN) server 110 may look up a subscriber database (not shown) based at least in part on the identification information associated with the mobile user device 118. The subscriber database (not shown) may contain information associated with the dual-mode operation and/or hand-off of the mobile user device 118. For example, the local area network (LAN) server 110 may determine that the mobile user device 118 may not be capable of dual-mode operation in local area network (LAN) 102 and the wide area network (WAN) 104. The local area network (LAN) server 110 may provide the mobile user device 118 with an error/warning message. Also, the local area network (LAN) server 110 may not provide the mobile user device 118 with an error/warning message and end the mobile user session.

Further at block 624, the local area network (LAN) server 110 may determine that the mobile user device 118 may be capable of dual-mode operation in the local area network (LAN) 102 and the wide area network (WAN) 104. The location register located at the local area network (LAN) server 110 may update a location record that the mobile user device 118 may be located within a local area network (LAN) 102. The local area network (LAN) server 110 may inform a router 108 that the mobile user device 118 may be within the coverage area of the local area network (LAN) 102. The router 108 may route the transmission/reception of data associated with the mobile user device 108 to the local area network (LAN) server 110. Also, the router 108 may inform wide area network (WAN) server 112 that the mobile user device 118 may entered the coverage area of the local area network (LAN) 102. The router 108 may provide the identification information associated with the mobile user device 118 to the wide area network (WAN) server 112. After the location register located at the local area network (LAN) server 110 may determine whether the mobile user device 118 may be capable of operating in dual-mode and/or hand-off between disparate networks, then the method of 600 may proceed to block 626.

At block 626, the mobile user device 118 may lose an association with the wide area network (WAN) 104. For example, the mobile user device 118 may move outside the coverage range of the wide area network (WAN) 104. The signal associated with the wide area network (WAN) 104 detected by the mobile user device 118 may be below the predetermined minimum signal strength. Therefore, the mobile user device 118 may lose an association with the wide area network (WAN) 104.

Figure 7:
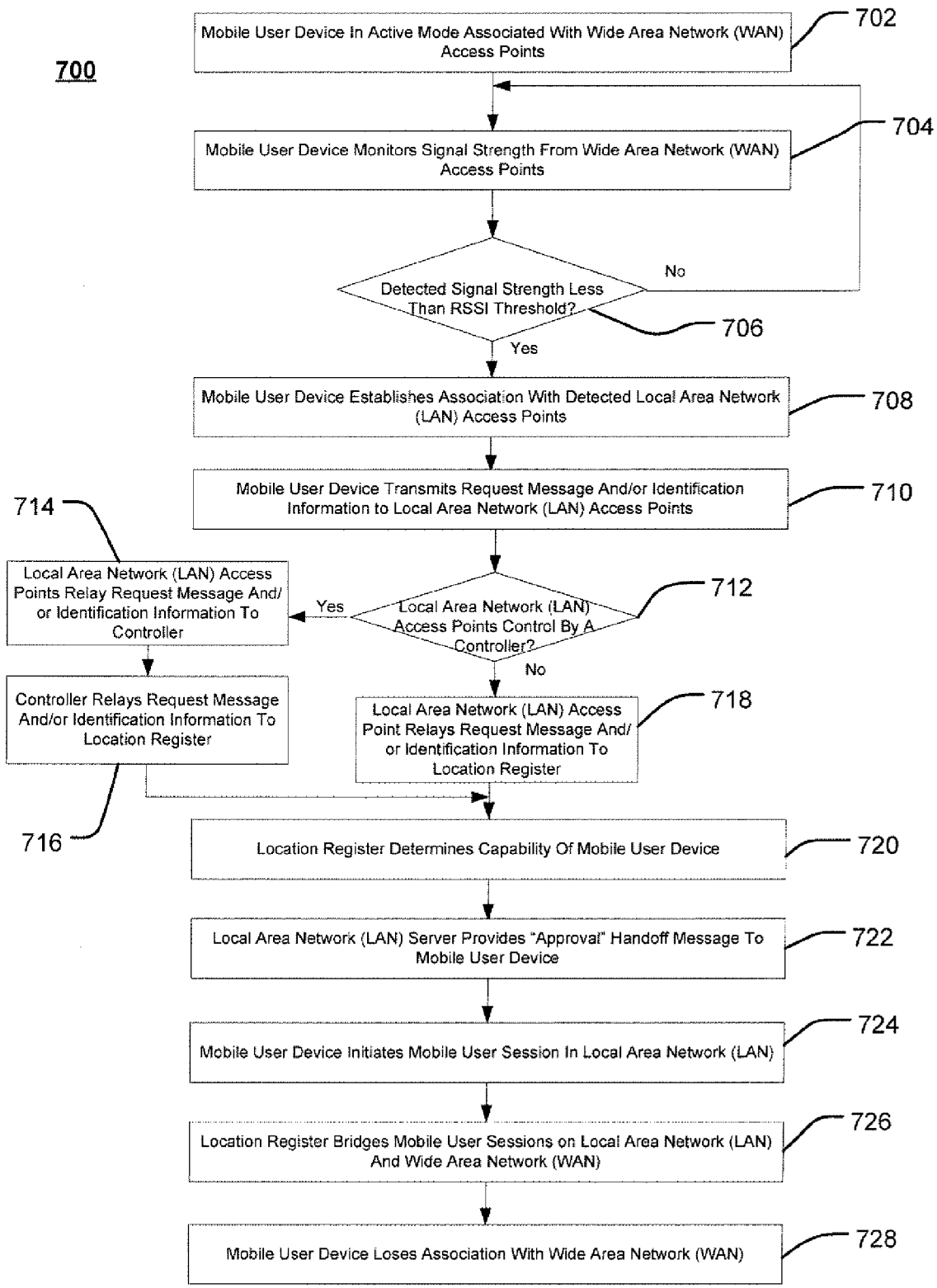
FIG. 7 is an exemplary flowchart illustrating a process of dual-mode hand-off from a wide area network (WAN) to a local area network (LAN) with a mobile user device in the active mode, according to an exemplary embodiment.

FIG. 7 is an exemplary flowchart illustrating a process of dual-mode hand-off from a wide area network (WAN) 104 to a local area network (LAN) 102 with a mobile user device in the active mode, according to an exemplary embodiment. This exemplary method 700 is provided by way of example, as there are a variety of ways to carry out the method. The method 700 shown in FIG. 7 can be executed or otherwise performed by one or a combination of various systems. The method 700 is described below may be carried out by system 100 shown in FIG. 1 by way of example, and various elements of the system 100 are referenced in explaining the exemplary method of FIG. 7. Each block shown in FIG. 7 represents one or more processes, methods or subroutines carried in exemplary method 700. A computer executable media having instructions to perform the method 700 may also be provided. Referring to FIG. 7, exemplary method 700 may begin at block 702.

At block 702, a mobile user device 118 may be in the active mode associated with wide area network (WAN) access points 116. For example, the mobile user device 118 may be associated with the user. The mobile user device 118 may be associated with the wide area network (WAN) 104 via the wide area network (WAN) access points 116. Also, the mobile user device 118 may be associated with identification information (e.g., phone number, electronic serial number (ESN), and/or uniform resource locator (URL)) to distinguish one mobile user device 118 from other mobile user devices 118 within the wide area network (WAN) 104. The wide area network (WAN) access points 116 may be in communication with the mobile user device 118 to identify a location associated with the mobile user device 118. The mobile user device 118 may be operating in an active mode (e.g., during a phone call) to transmit/receive a signal from the wide area network (WAN) access points 116. After the mobile user device 118 may be in the active mode associated with the wide area network (WAN) access points 116, the method 700 may proceed to block 704.

At block 704, the mobile user device 118 may monitor a detected signal strength from the wide area network (WAN) access points 116 via a received signal strength indicator. The mobile user device 118 may monitor the signal strength from the wide area network (WAN) access points 116 at a predetermined period. For example, the mobile user device 118 may monitor the signal strength from the wide area network (WAN) access points 116 every microsecond to one second. The mobile user device 118 may move within a coverage range of the local area network (LAN) 102 and/or outside the coverage range of the wide area network (WAN) 104. The signal strength detected by the mobile user device 118 may become weaker as the mobile user device 118 move within a coverage range of the local area network (LAN) 102 and/or outside the coverage range of the wide area network (WAN) 104. After the mobile user device 118 may monitor a detected signal strength from the wide area network (WAN) access points 116, the method 700 may proceed to block 706.

At block 706, the mobile user device 118 may determine whether the detected signal strength from the wide area network (WAN) access points 116 may be below the received signal strength indicator (RSSI) threshold. The mobile user device 118 may compare the detected signal strength from the wide area network (WAN) access points 116 with the received signal strength indicator (RSSI) threshold. For example, the received signal strength indicator (RSSI) threshold may be defined by the sum of the minimum received signal strength (e.g., minimum signal strength to maintain a mobile user session) and the received signal strength margin. In the event that the detected signal strength from the wide area network (WAN) access points 116 may be greater than the received signal strength indicator (RSSI) threshold, the mobile user device 118 may continue monitor the signal strength from the wide area network (WAN) access points 116. In the event that the detected signal strength from the wide area network (WAN) access points 116 may be less than the received signal strength indicator (RSSI) threshold, the method 700 may proceed to block 708.

At block 708, the mobile user device 118 may establish an association with the detected local area network (LAN) access points 114. In the event that the detected signal strength from the wide area network (WAN) access points 116 may be below the received signal strength indicator (RSSI) threshold, the mobile user device 118 may initiate a search for a signal associated with the local area network 102. The mobile user device 118 may attempt to establish an association with the local area network (LAN) 102. After the mobile user device 118 may establish an association with the detected local area network (LAN) access points 114, the method of 700 may proceed to block 710.

At block 710, the mobile user device 118 may transmit a request message for dual-mode hand-off and/or identification information (e.g., phone number, electronic serial number (ESN), and/or uniform resource locator (URL)) associated with the mobile user device 118 to the local area network (LAN) access points 114. Also, the mobile user device 118 may have transmitted the identification information associated with the mobile user device 118 to the local area network (LAN) access points 114 in a pervious communication. Further, the mobile user device 118 may transmit the request message for dual-mode hand-off to the local area network (LAN) access points 114. After the mobile user device 118 may transmit the identification information associated with the mobile user device 118 and/or the request message for dual-mode hand-off to the local area network (LAN) access points 114, the method 700 may proceed to block 712.

At block 712, the local area network (LAN) access points 114 may determine whether the local area network (LAN) access points 114 may be controlled by one or more controllers. For example, the local area network (LAN) 102 may include a single local area network (LAN) access point 114 and the single local area network (LAN) access point 114 may not be controlled by the controller, then the method of 700 may proceed to block 718. At block 718, the local area network (LAN) access points 114 may directly relay the identification information associated with the mobile user device 118 and/or request message for dual-mode hand-off to the local area network (LAN) access points 114 to a location register located at the local area network (LAN) server 110. Also for example, the local area network 102 may include a plurality of local area network (LAN) access points 114 that may be controlled by one or more controllers, then the method of 700 may proceed to block 714.

At block 714, the local area network (LAN) access points 114 may relay the request message for dual-mode hand-off and/or the identification information associated with the mobile user device 118 to the one or more controllers. After the method at block 714, the method of 700 may proceed to block 716.

At block 716, the one or more controllers may relay the request message for dual-mode hand-off and/or identification information associated with the mobile user device 118 to a location register located at the location area network (LAN) server 110. For example, the controller associated with the local area network (LAN) 102 may directly relay the request message for dual-mode mode hand-off and/or the identification information associated with the mobile user device 118 to the location register located at the local area network (LAN) server 110. Also, the one or more controllers associated with the local area network 102 may process and/or format the request message for dual-mode mode hand-off and/or the identification information associated with the mobile user device 118 before relaying to the location register located at the local area network (LAN) server 110. After the one or more controllers may relay the request message for dual-mode mode hand-off and identification information associated with the mobile user device 118 to the location register located at the local area network (LAN) server 110, the method of 700 may proceed to block 720.

At block 720, the location register located at the local area network (LAN) server 110 may determine whether the mobile user device 118 may be capable of operating in dual-mode and/or hand-off between disparate networks. For example, the local area network (LAN) server 110 may look up a subscriber database (not shown) based at least in part on the identification information associated with the mobile user device 118. The subscriber database (not shown) may contain information associated with the dual-mode operation and/or hand-off option of the mobile user device 118. The location register located at the local area network (LAN) access point 114 may verify the dual-mode capability associated with the mobile user device 118. For example, the local area network (LAN) server 110 may determine that the mobile user device 118 may not be capable of dual-mode operation in the local area network (LAN) 102 and the wide area network (WAN) 104. The local area network (LAN) server 110 may provide the mobile user device 118 with an error/warning message. Also, the local area network (LAN) server 110 may not provide the mobile user device 118 with an error/warning message and end the mobile user session. Further, the local area network (LAN) server 110 may determine whether the mobile user device 118 may be capable of dual-mode operation in the local area network (LAN) 102 and the wide area network (WAN) 104, then the method of 700 may proceed to block 722.

At block 722, the local area network (LAN) server 110 may provide an "approval" handoff message to the mobile user device 118. For example, the approval handoff message to the mobile user device 108 may be transmitted by the local area network (LAN) server 110 via the local area network (LAN) access points 114. Also, the approval handoff message to the mobile user device 118 may be transmitted by the local area network (LAN) server 110 via the wide area network (WAN) server 112 and/or the wide area network (WAN) access points 116. After the local area network (LAN) server 110 may provide an "approval" handoff message to the mobile user device 118, the method 700 may proceed to block 724.

At block 724, the mobile user device 118 may initiate a mobile user session (e.g., places a call to the same party that the user was already talking to) in the local area network (LAN) 102 with the identification information associated with the mobile user device 118. The mobile user device 118 may establish an association with the local area network (LAN) 102 via the local area network (LAN) access points 114. Also, the mobile user device 118 may initiate the mobile user session over the local area network (LAN) 102 via the local area network (LAN) access points 114. After, the mobile user device 118 may initiate the mobile user session, the method 700 may proceed to block 726.

At block 726, the location register located at the local area network (LAN) server 110 may bridge the mobile user sessions carried on the local area network (LAN) 102 and the wide area network (WAN) 104. For example, the wide area network (WAN) access points 116 may provide a mobile user session request message and/or call-processing message to the location register located at the local area network (LAN) server 110. Further, the local area network (LAN) server 110 may update a list of mobile user device 118 in the local area network (LAN) 102. The mobile user device 118 may transmit/receive data from the local area network (LAN) 102 and the wide area network (WAN) 104. A router 108 may mange the transmission/reception of data to and from the mobile user device 118 via the local area network (LAN) 102 and the wide area network (WAN) 104. After, the mobile user device 118 may initiate the mobile user session (e.g., places a call to the same party that the user was already talking to) in the local area network (LAN) 102 with the identification information associated with the mobile user device 118, the method 700 may proceed to block 728.

At block 728, the mobile user device 118 may lose an association with the wide area network (WAN) 104. For example, the wide area network (WAN) access points 116 may start a disassociation timer. For example, the mobile user device 118 may move outside of the coverage range of the wide area network (WAN) access points 116 and/or become disassociated with the wide area network (WAN) 104. The wide area network (WAN) access points 116 may start the disassociation timer. The disassociation timer may be based at least in part on the radio characteristic of the channel utilized by the mobile user device 118.

Also at block 728, the disassociation timer may determine whether the amount of time the mobile user device 118 may be disassociated with the wide area network (WAN) access points 116 may exceed a predetermined disassociation threshold time. In the event that, the amount of time the mobile user device 118 may be disassociated with the wide area network (LAN) access points 116 may not exceed the predetermined disassociation threshold time, the mobile user device 118 may attempt to reestablish an association with the wide area network (WAN) access points 116. Also in the event that, the amount of time the mobile user device 118 may be disassociated with the wide area network (WAN) 104 may exceed the predetermined disassociation threshold time, a loss of association (LoA) and/or identification information associated with the mobile user device 118 may be relayed to the location register located at a local area network (LAN) server 110.

Further at block 728, the wide area network (WAN) access points 116 may relay the loss of association (LoA) message and/or the identification information associated with the mobile user device 118 to the location register located at the wide area network (WAN) server 112. For example, the wide area network (WAN) 104 may include a single wide area network (WAN) access point 116 and the single wide area network (WAN) access point 116 may not be controlled by a controller. The wide area network (WAN) access points 116 may relay the loss of association (LoA) message and/or the identification information associated with the mobile user device 118 directly to the location register located at the wide area network (WAN) server 112.

Furthermore at block 728, the wide area network 104 may include a plurality of wide area network (WAN) access points 116 that may be controlled by one or more controllers. The wide area network (WAN) access points 116 may relay the loss of association (LoA) message and/or the identification information associated with the mobile user device 118 to the one or more controllers. Further, the one or more controllers may relay the loss of association (LoA) message and/or the identification information associated with the mobile user device 118 to the location register at the wide area network (WAN) server 112. For example, the one or more controllers may directly transfer the loss of association (LoA) message and/or the identification information associated with the mobile user device 118 to the location register at the wide area network (WAN) server 112. Also, the one or more controllers may process and/or format the loss of association (LoA) message and/or the identification information associated with the mobile user device 118 before relaying to the location register located at the wide area network (WAN) server 112. For example, the one or more controllers may encode and/or verify the loss of association (LoA) message and/or the identification information associated with the mobile user device 118 before relying the processed loss of association (LoA) message and/or the identification information associated with the mobile user device 118 to the location register located at the wide area network (WAN) server 112.

Moreover at block 728, the location register located at the wide area network (WAN) server 112 may update a location record associated with the mobile user device 118. The wide area network (WAN) server 112 may receive the lack of association (LoA) message from the wide area network (WAN) access points 116 or the one or more controllers and may update a location record associated with the mobile user device 118. For example, the wide area network (WAN) server 112 may remove the mobile user device 118 record from the location record. The wide area network (WAN) server 112 may search for the mobile user device 118 in the location record based at least in part on the identification information associated with the mobile user device 118. The location register located at the wide area network (WAN) server 112 may remove the mobile user device 118 from the location record stored in the wide area network (WAN) server 112. Also, the wide area network (WAN) server 112 may verify dual mode capability of the mobile user device 118 via a subscriber database (not shown). The wide area network (WAN) server 112 may provide the identification information associated with the mobile user device 118 in the wide area network (WAN) 104 to the local area network (LAN) server 110. Also, the wide area network (WAN) server 112 may update the location record that the mobile user device 118 may be located in the local area network (LAN) 102. Further, the wide area network (WAN) server 112 may inform a router 108 that the mobile user device 118 may no longer be associated with the wide area network (WAN) 104.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

What is claimed is:

1. A method, comprising:
    locating a mobile user device within a local area network based at least in part on identification information associated with the mobile user device;
    determining a signal strength associated with the mobile user device; and
    in response to determining that the signal strength is below a predetermined threshold signal strength:
        starting a disassociation timer of variable duration, the duration being based on the determined signal strength, such that the duration is shorter when the determined signal strength is substantially below the predetermined threshold signal strength than when the determined signal strength is slightly below the predetermined threshold signal strength,
        determining whether the disassociation timer has expired,
        upon expiration of the disassociation timer, associating the mobile user device with a wide area network based at least in part on the identification information associated with the mobile user device,
        updating a location register of a local area network server of a physical location associated with the mobile user device, and
        removing a location record of the mobile user device from a list of the mobile user devices located in the local area network, the location record based in part on the identification information associated with the mobile user device.

2. The method of claim 1, wherein the identification information comprises at least one of a phone number, an electronic serial number (ESN), and an uniform resource locator (URL).

3. The method of claim 1, further comprising providing at least one of a lack of association message and the identification information associated with the mobile user device to the local area network server.

4. The method of claim 1, further comprising initiating a mobile user session in the wide area network based at least in part on the identification information associated with the mobile user device.

5. A method, comprising:
    locating a mobile user device in a wide area network based at least in part on identification information associated with the mobile user device;
    in the event the mobile user device detects a signal associated with a local area network,
        starting a disassociation timer, the disassociation timer having a variable duration and being configured to keep time in the event a signal strength associated with the mobile user device in the wide area network is below a predetermined threshold signal strength, the duration being dependent on the signal strength, such that the duration is shorter when the determined signal strength is substantially below the predetermined threshold signal strength than when the determined signal strength is slightly below the predetermined threshold signal strength;
        determining whether the disassociation timer has expired;
        upon expiration of the disassociation timer, associating the mobile user device with the local area network based at least in part on the identification information associated with the mobile user device;
        updating a location register of a wide area network server of a physical location associated with the mobile user device; and
        removing a location record of the mobile user device from a list of the mobile user devices located in the wide area network, the location record based in part on the identification information associated with the mobile user device.

6. The method of claim 5, wherein the identification information comprises at least one of a phone number, an electronic serial number (ESN), and an uniform resource locator (URL).

7. The method of claim 5, further comprising associating at least one of an automatic hand-off option, a best-quality hand-off option, a no hand-off option and a dual-mode operation hand-off option with the mobile user device.

8. The method of claim 5, further comprising searching for a local area network signal in the event of the signal strength from the wide area network descends below the predetermined threshold signal strength.

9. The method of claim 5 further comprising initiating a mobile user session in the local area network based at least in part on the identification information associated with the mobile user device.

10. A system, comprising:
a processor; and
a local area network server configured to:
locate a mobile user device within a local area network based at least in part on identification information associated with the mobile user device;
start a disassociation timer, the disassociation timer having a variable duration and being configured to keep time in the event a signal strength associated with the mobile user device in the local area network is below a predetermined threshold signal strength, the duration being dependent on the signal strength, such that the duration is shorter when the determined signal strength is substantially below the predetermined threshold signal strength than when the determined signal strength is slightly below the predetermined threshold signal strength;
determine whether the disassociation timer has expired;
upon expiration of the disassociation timer, associate the mobile user device with a wide area network based at least in part on the identification information associated with the mobile user device in the event the signal strength associated with the mobile user device is below the predetermined threshold signal strength;
update a location register of the local area network server of a physical location associated with the mobile user device; and
remove a location record of the mobile user device from a list of the mobile user devices located in the local area network, the location record based in part on the identification information associated with the mobile user device.

11. The system of claim 10, wherein the identification information comprises at least one of a phone number, an electronic serial number (ESN), and an uniform resource locator (URL).

12. The system of claim 10, further comprising a router configured to determine a transmission path for data to travel to at least one of the local area network and the wide area network.

13. The system of claim 10, further comprising a controller configured to control one or more access points associated with at least one of the local area network and the wide area network.

14. A system, comprising:
a processor; and
a wide area network server configured to:
locate a mobile user device in a wide area network based at least in part on identification information associated with the mobile user device;
start a disassociation timer, the disassociation timer having a variable duration and being configured to keep time in the event a signal strength associated with the mobile user device in the wide area network is below a predetermined threshold signal strength, the duration being dependent on the signal strength, such that the duration is shorter when the determined signal strength is substantially below the predetermined threshold signal strength than when the determined signal strength is slightly below the predetermined threshold signal strength;
determine whether the disassociation timer has expired;
upon expiration of the disassociation timer, associate the mobile user device with a local area network based at least in part on the identification information associated with the mobile user device in the event of the mobile user device detects a signal associated with the local area network;
update a location register of a physical location associated with the mobile user device; and
remove a location record of the mobile user device from a list of the mobile user devices located in the wide area network, the location record based in part on the identification information associated with the mobile user device.

15. The system of claim 14, wherein the identification information comprises at least one of a phone number, an electronic serial number (ESN) and an uniform resource locator (URL).

16. The system of claim 14, wherein the mobile user device is configured to be associated with at least one of an automatic hand-off option, a best-quality hand-off option, a no hand-off option, and dual-mode operation hand-off option.

17. The system of claim 14, further comprising a transceiver associated with the mobile user device configured to search for the signal associated with the local area network in the event of the signal strength from the wide area network descends to the predetermined threshold signal strength.

18. The system of claim 14, further comprising a controller configured to control the one or more access points associated with at least one of the local area network and the wide area network.

19. The method of claim 1, further comprising the wide area network server providing the identification information associated with the mobile user device to the local area network server.

20. The method of claim 5, further comprising the wide area network server providing the identification information associated with the mobile user device to a local area network server.

21. The method of claim 1, wherein a duration of the timer is based at least in part on at least one of frequency, phase and amplitude of a channel used by the mobile user device.

22. The method of claim 1, wherein after starting the disassociation timer, in the event an amount of time does not exceed a predetermined disassociation threshold time associated with the disassociation timer, the mobile user device attempts to reestablish association with the local area network.

23. The method of claim 1, wherein the updating a location register of a local area network server of a physical location associated with the mobile user device, and the removing a record of the mobile user device from a list of the mobile user devices located in the local area network, occur after expiration of the disassociation timer.

24. The method of claim 1, wherein the disassociation timer is set to a predetermined duration of between 0.001 and 1 seconds.

* * * * *